United States Patent
Naito et al.

(10) Patent No.: US 12,306,619 B2
(45) Date of Patent: May 20, 2025

(54) SYSTEM, METHOD, AND RECORDING MEDIUM HAVING RECORDED THEREON PROGRAM

(71) Applicant: Yokogawa Electric Corporation, Tokyo (JP)

(72) Inventors: Takashi Naito, Tokyo (JP); Paul Kennedy, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/692,115

(22) Filed: Mar. 10, 2022

(65) Prior Publication Data
US 2022/0197267 A1    Jun. 23, 2022

Related U.S. Application Data

(63) Continuation of application No. PCT/JP2020/035876, filed on Sep. 23, 2020.

(30) Foreign Application Priority Data

Sep. 30, 2019  (JP) ................. 2019-178718

(51) Int. Cl.
*G05B 19/418* (2006.01)
*C10G 7/12* (2006.01)
(Continued)

(52) U.S. Cl.
CPC ......... *G05B 19/41885* (2013.01); *C10G 7/12* (2013.01); *C10G 11/187* (2013.01);
(Continued)

(58) Field of Classification Search
CPC .... G05B 19/41885; G05B 2219/32385; C10G 7/12; C10G 11/187; C10G 45/72; C10G 2400/02; G06Q 10/0637; G06Q 50/04
(Continued)

(56) References Cited

U.S. PATENT DOCUMENTS

2007/0129917 A1   6/2007  Blevins
2007/0234781 A1*  10/2007 Yamada ............. G05B 13/0265
                                         73/23.2
(Continued)

FOREIGN PATENT DOCUMENTS

JP        2007018283 A  *  1/2007
WO   WO-2021056590 A1 *  4/2021

OTHER PUBLICATIONS

Yokomizo Akira et al., "Petroleum Refining Technology and Petroleum Supply and Demand Trends—Current Status and Future Prospects—," Japan Petroleum Institute for Natural Gas and Metals; Petroleum, Natural Gas Resources Information, Sep. 20, 2017, Oil and Gas Review vol. 51 No. 5, p. 1-20.
(Continued)

*Primary Examiner* — Abdallah A El-Hage Hassan

(57) ABSTRACT

Provided is a system including a planning section that generates a production plan for a production site, using a planning model; a simulating section that simulates operation of at least a portion of the production site, based on a simulation model of the at least a portion of the production site; a monitoring section that monitors actual operation of the at least a portion of the production site; a calibrating section that calibrates the simulation model, based on a difference between the simulated operation and the actual operation; and a control section that controls the at least a portion of the production site, based on a simulation result obtained by simulating the operation of the at least a portion of the production site in accordance with the production plan, using the simulation model that has been calibrated.

20 Claims, 6 Drawing Sheets

(51) Int. Cl.
    *C10G 11/18*     (2006.01)
    *C10G 45/72*     (2006.01)
    *G06Q 10/0637*     (2023.01)
    *G06Q 50/04*     (2012.01)

(52) U.S. Cl.
    CPC ......... *C10G 45/72* (2013.01); *G06Q 10/0637* (2013.01); *G06Q 50/04* (2013.01); *C10G 2400/02* (2013.01); *G05B 2219/32385* (2013.01)

(58) Field of Classification Search
    USPC ....................................................... 705/7.36
    See application file for complete search history.

(56) References Cited

U.S. PATENT DOCUMENTS

| | | | |
|---|---|---|---|
| 2009/0095657 A1 | 4/2009 | Taha | |
| 2009/0132060 A1* | 5/2009 | Jenks | ................. G05B 17/02 |
| | | | 700/86 |
| 2011/0250582 A1 | 10/2011 | Gates | |
| 2015/0286626 A1* | 10/2015 | Romatier | ............ G06F 3/04847 |
| | | | 715/217 |
| 2021/0365880 A1* | 11/2021 | Garay | ................ G06Q 10/0833 |

OTHER PUBLICATIONS (ISA/237) Written Opinion of the International Search Authority for International Patent Application No. PCT/JP2020/035876, issued/mailed by the Japan Patent Office on Apr. 5, 2022.

Extended European Search Report for counterpart European Application No. 20872483.1, issued by the European Patent Office on Sep. 20, 2023.

\* cited by examiner

120R

SYSTEM, METHOD, AND RECORDING MEDIUM HAVING RECORDED THEREON PROGRAM

The contents of the following Japanese patent application(s) are incorporated herein by reference:
NO. 2019-178718 filed in JP on Sep. 30, 2019
NO. PCT/JP2020/035876 filed in WO on Sep. 23, 2020

BACKGROUND

1. Technical Field

The present invention relates to a system, a method, and a recording medium having recorded thereon a program.

2. Related Art

Petroleum refinement is known for refining crude oil to produce multiple petroleum products, as shown in Non-Patent Document 1, for example. Conventionally, when operating a relatively large-scale production site, such as a refinery where such petroleum refinement is performed, enterprise resource planning, manufacturing execution, process control, and the like are each performed independently using a system in which different groups (or departments) in an origination are independent from each other.

PRIOR ART DOCUMENT

Non-Patent Document

Non-Patent Document 1: Yokomizo, "Petroleum Refining Technology and Petroleum Supply and Demand Trends—Current Status and Future Prospects—," Japan Petroleum Institute for Natural Gas and Metals; Petroleum, Natural Gas Resources Information, Sep. 20, 2017, Oil and Gas Review Vol. 51 No. 5, p. 1-20

When operating a production site, it is preferable to be able to more efficiently control the production site.

GENERAL DISCLOSURE

To solve the above problems, according to a first aspect of the present invention, provided is a system. The system may comprise a planning section that generates a production plan for a production site, using a planning model. The system may comprise a simulating section that simulates operation of at least a portion of the production site, based on a simulation model of the at least a portion of the production site. The system may comprise a monitoring section that monitors actual operation of the at least a portion of the production site. The system may comprise a calibrating section that calibrates the simulation model, based on a difference between the simulated operation and the actual operation. The system may comprise a control section that controls the at least a portion of the production site, based on a simulation result obtained by simulating the operation of the at least a portion of the production site in accordance with the production plan, using the simulation model that has been calibrated.

The production site may include a refinery that produces a plurality of petroleum products by refining crude oil.

The at least a portion of the production site may include at least one of a crude distillation unit, vacuum distillation unit, naphtha hydrotreating unit, catalytic reforming unit, benzene extraction unit, kerosene hydrotreating unit, diesel desulfurization unit, heavy oil desulfurization unit, fluid catalytic cracking unit, FCC gasoline desulfurization unit, thermal cracking unit, hydrocracker unit, or asphalt production unit.

The control section may control at least one of a reactor temperature, distillation cut temperature, furnace outlet temperature, stripping steam ratio, reflux ratio, reboiler duty or pump around heat removal rate.

The at least a portion of the production site may be one process unit at the production site.

The at least a portion of the production site may be a group of a plurality of process units at the production site.

The control section may select a set of control parameters that realizes a simulation result that maximizes gross profit, from among a plurality of simulation results obtained by simulating operation of the at least a portion of the production site a plurality of times using different sets of control parameters.

The simulation model may be a steady state model.

The planning model may be a linear programming model.

The calibrating section may calibrate the simulation model when the difference exceeds a predetermined threshold value.

According to a second aspect of the present invention, provided is a method. The method may comprise generating a production plan for a production site, using a planning model. The method may comprise simulating operation of at least a portion of the production site, based on a simulation model of the at least a portion of the production site. The method may comprise monitoring actual operation of the at least a portion of the production site. The method may comprise calibrating the simulation model, based on a difference between the simulated operation and the actual operation. The method may comprise controlling the at least a portion of the production site, based on a simulation result obtained by simulating the operation of the at least a portion of the production site in accordance with the production plan, using the simulation model that has been calibrated.

According to a third aspect of the present invention, provided is a recording medium having recorded thereon a program. The program may be executed by a computer. The program may cause the computer to function as a planning section that generates a production plan for a production site, using a planning model. The program may cause the computer to function as a simulating section that simulates operation of at least a portion of the production site, based on a simulation model of the at least a portion of the production site. The program may cause the computer to function as a monitoring section that monitors actual operation of the at least a portion of the production site. The program may cause the computer to function as a calibrating section that calibrates the simulation model, based on a difference between the simulated operation and the actual operation. The program may cause the computer to function as a control section that controls the at least a portion of the production site, based on a simulation result obtained by simulating the operation of the at least a portion of the production site in accordance with the production plan, using the simulation model that has been calibrated.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

A system according to the present embodiment relates to operation of a production site and, as an example, may realize some of the functions of a total solution model that realizes improvement of production efficiency, by organically integrating various functions from an enterprise resource planning (ERP) layer to a manufacturing execution system (MES) layer and a process control system (PCS) layer, and linking management information and control information. As an example, the system according to the present embodiment calibrates a model that simulates the operation of the production site based on the difference between a simulation result and the actual operating situation in a portion of such a total solution model, and controls the production site based on the simulation results obtained using the calibrated model.

In the following description, an example is used in which the system according to the present embodiment is applied to the operation performed in a refinery and a petrochemical site, but the present embodiment is not limited to this. As an example, the system according to the present embodiment may be applied to operation of a production site other than a refinery or petrochemical site.

Figure 1:
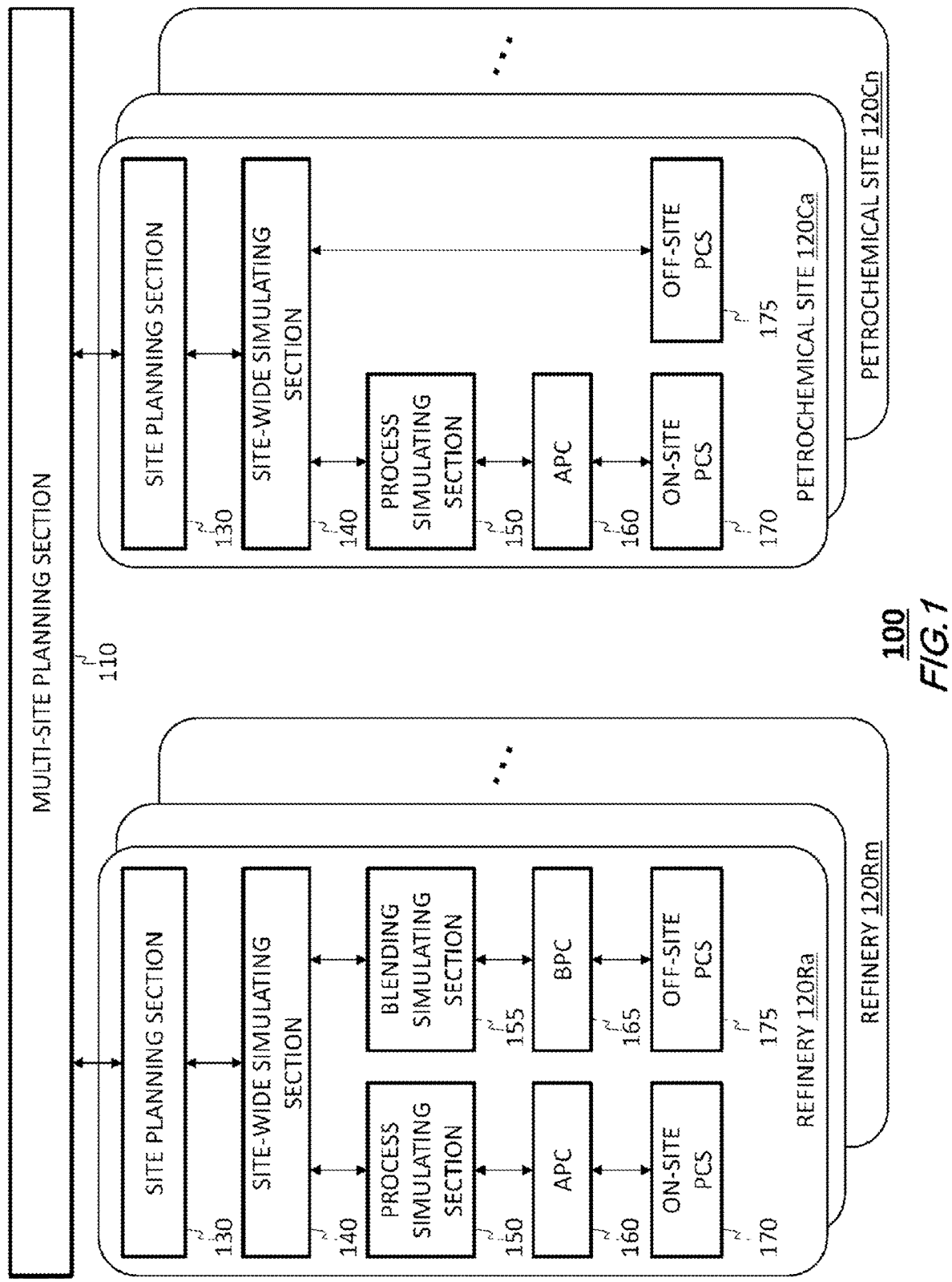
FIG. 1 shows an example of a total solution model 100 of an operation management system that may include the system according to the present embodiment as a portion thereof.

FIG. 1 shows an example of a total solution model 100 of an operation management system that may include the system according to the present embodiment as a portion thereof. The total solution model 100 comprehensively manages a plurality of production sites associated with the same organization (run by the same company, run by the same group of companies, or the like). For example, the total solution model 100 may comprehensively manage a plurality of refineries and a plurality of petrochemical sites that are run worldwide by the same group of companies. In the present drawing, the total solution model 100 includes a multi-site planning section 110, m refineries 120Ra to 120Rm (referred to collectively as the "refineries 120R"), and n petrochemical sites 120Ca to 120Cn (referred to collectively as the "petrochemical sites 120C"). If there is no particular reason to make a distinction, the refineries 120R and the petrochemical sites 120C are referred to collectively as production sites 120.

The multi-site planning section 110 comprehensively generates a production plan for each of the plurality of production sites 120 associated with the same organization. As an example, the multi-site planning section 110 comprehensively generates a production plan for each of the refineries 120Ra to 120Rm and the petrochemical sites 120Ca to 120Cn using a linear programming technique. Generally, with a mathematical model for determining work or intent, the problem of finding the value of a variable that gives the largest objective function under certain mathematical conditions is referred to as a mathematical programming problem. In particular, a case where the expression representing the objective function and the expression representing the mathematical conditions are represented by linear equations of variables is referred to as a linear programming problem. The technique for solving this problem is the linear programming technique.

More specifically, the linear programming technique is generally a technique for solving a problem of maximizing (or minimizing) an objective function shown by Math. 2, under constraint conditions shown by Math. 1. Here, x is an (n×l) variable matrix in which each element is restricted non-negatively by Math. 1. Furthermore, when i=1, 2, or 3, $A_i$ is an ($m_i$×n) coefficient matrix and $b_i$ is an ($m_i$×l) coefficient matrix. Furthermore, c is an (n×l) coefficient matrix. In this way, with the linear programming technique, a plurality of linear expressions are used, and each of the plurality of linear expressions is represented as a linear programming table. Each entry in the linear programming table is a coefficient for a respective one of a plurality of variables. The linear programming technique includes deriving a combination of variable values that maximize (or minimize) the objective function of Math. 2, under the constraint conditions shown by Math. 1, by repeatedly testing different combinations of a plurality of variables using matrix mathematics.

$$A_1 x \leq b_1, \qquad \text{[Math. 1]}$$
$$A_2 x \geq b_2,$$
$$A_3 x = b_3,$$
$$x \geq 0$$
$$z = {}^t c x \qquad \text{[Math. 2]}$$

As an example, the multi-site planning section 110 acquires business information including crude oil quantity, crude oil type, crude oil price, product price, product demand, process unit availability, process unit maximum capacity, and the like via a network, various memory devices, user input, or the like. A "process unit" refers to a unit that performs any one of various processes needed to produce a product or semi-finished product from a raw material, or any processes associated with these various processes, at the production site 120. The business information such as described above includes a variable (e.g. crude oil price or the like) determined by a business environment or the like and a variable (e.g. crude oil amount or the like) determined by a business decision or the like, for example. It is difficult to purposefully change a variable determined by the business environment or the like, but a variable determined by a business decision or the like can be freely changed to a certain extent at according to the intent of the management. The multi-site planning section 110 derives a combination of variables that maximize the "gross profit", which is an example of the objective function, by performing a multi-site planning process a plurality of times while changing the values of variables determined by such management decisions or the like. In this case, the multi-site planning section 110 generates, for each of a plurality of production sites 120, a production plan including information such as oil balance (input and output of the production site 120), economic balance (price and income for all input and output of the production site 120), gross profit, operating cost or net profit, energy balance (flow rate and heat quantity of fuel consumed in each process and in all processes in total), a process unit summary (summary of material balance and stream property), a marginal value (value indicating which constraint can realize a greater profit if relaxed), blend summary (summary of a mixture of components including the amount and property of each component), and reports concerning any of the above.

At this time, the multi-site planning section 110 generates, for each production site 120, a production plan for each of one or more relatively long multi-site plan intervals in a relatively long-term multi-site plan period. For example, the multi-site planning section 110 may generate, for each of the plurality of production sites 120, a production plan for each month in a period of the following three months. The multi-site planning section 110 supplies each of the plurality of production sites 120 with the production plans generated respectively for the plurality of production sites 120, via a network, various memory devices, user input, or the like.

The refineries 120R produce a plurality of petroleum products by refining crude oil. The petroleum refinement of the refineries 120R is described in detail further below. Each refinery 120R includes a site planning section 130, a site-wide simulating section 140, a process simulating section 150, a blending simulating section 155, an APC (Advanced Process Control) 160, a BPC (Blend Property Control) 165, an on-site process control system 170, and an off-site process control system 175. The above describes an example where each refinery 120R is provided with all of these function sections, but the present embodiment is not limited to this. As an example, some of these function sections, e.g. at least one of the site planning section 130, the site-wide simulating section 140, the process simulating section 150, or the blending simulating section 155, may be provided in at a location other than the refinery 120R.

The site planning section 130 generates a production plan for the production site 120 with which it is associated, using the linear programming technique, for example. At this time, the site planning section 130 may use a linear programming table having the same structure as the table used when the multi-site planning section 110 generated the production plan. As an example, the site planning section 130 acquires the production plan for the production site 120 with which the site planning section 130 is associated, from among the production plans generated by the multi-site planning section 110, via a network, various memory devices, user input, or the like. Furthermore, the site planning section 130 acquires business information that is more detailed than the business information used when the multi-site planning section 110 generated the production plan and tailored to the production site 120 with which the site planning section 130 is associated, via a network, various memory devices, user input, or the like. Such detailed business information includes a variable determined by the business environment or the like at site level and a variable determined by a decision or the like made at site level, for example. It is difficult to purposefully change a variable determined by the business environment or the like at site level, but a variable determined by a business decision or the like made at site level can be freely changed to a certain extent at according to the intent at site level. As an example, the site planning section 130 uses a linear programming table with the same structure as the table used by the multi-site planning section 110, to input parameter data that has been determined by the production plan generated by the multi-site planning section 110 and to perform the site planning process a plurality of times while changing the values of the variables determined by a decision or the like made at site level, in order to derive the combination of variable values that maximize the "gross profit", for example. The site planning section 130 then generates the production plan obtained in this case as the more detailed production plan tailored to the production site 120 with which the site planning section 130 is associated.

At this time, the site planning section 130 generates, for the production site 120 with which the site planning section 130 is associated, a production plan for each of one or more relatively short site planning intervals in a relatively short-term site planning period, compared to the site planning period of the production plan generated by the multi-site planning section 110. For example, the site planning section 130 may generate, for the production site 120 with which the site planning section 130 is associated, a production plan for each week in a period of the following one month. The site planning section 130 supplies the production plan that it generated to another function section or apparatus, via a network, various memory devices, user input, or the like.

If a problem would occur (e.g. if gross profit, production volume requirement, product quality specification, and tank storage capacity would drop below a threshold value or physical constraint) in the production plan of the production site 120 with which the site planning section 130 is associated when using the parameters determined by the production plan generated by the multi-site planning section 110, the site planning section 130 may provide feedback about this problem to the multi-site planning section 110 and generate a request to change a business decision made at the multi-site level.

The site planning section 130 may have a function of a scheduler that schedules operations at the production site 120 in units of single days or multiple days, for example, according to the production plan generated by this site planning section 130. The above describes an example in which the site planning section 130 has the function of a scheduler, but the present embodiment is not limited to this. The refinery 120R may include a scheduler as another function section or apparatus differing from the site planning section 130. The scheduler may acquire basic schedule information including tank information, a transport ship schedule, a pipeline delivery schedule, a road or rail schedule, and the like, for example, via a network, various memory devices, user input, or the like. In a case where the scheduler is configured as a function section or apparatus differing from the site planning section 130, the scheduler acquires the production plan generated by the site planning section 130 via a network, various memory devices, user input, or the like. The scheduler then generates daily schedule information at the production site 120, for example, according to the acquired production plan, and supplies this daily schedule information to another function section or apparatus via a network, various memory devices, user input, or the like.

The site-wide simulating section 140 simulates the site-wide operation of the production site 120. That is, the site-wide simulating section 140 simulates the site-wide behavior of responses corresponding to input, output, and processing content at the production site 120. In the present drawing, the site-wide simulating section 140 performs site-wide simulation of the operation of on-site process units and off-site process units. As an example, "on-site" indicates the site where refining equipment is provided at the refinery 120R. Furthermore, "off-site" indicates a site where equipment around a tank yard that is outside where the refining equipment is provided at the refinery 120R, i.e. a site where ancillary equipment for receiving, storing, blending, and shipping crude oil, products, or semi-finished products is provided. The site-wide simulating section 140 acquires site information including information such as supply flow, product flow, temperature, pressure, and lab data concerning supply quality and product quality at the production site 120, via a network, various memory devices, user input, or the like. As an example, the site-wide simulating section 140 inputs the site information to a steady state model, simulates the operation of the production site 120, and outputs site-wide simulation results including information such as production amount, properties, site conditions, and performance at the production site 120. The steady state model is a model that outputs a constant result that does not change over time, in response to input that does not develop or change over time. At this time, the site-wide simulating section 140 may output the site-wide simulation results based at least partially on the schedule information generated by the scheduler. In other words, the site-wide simulating section 140 may output the site-wide simulation results obtained in a case where the production site 120 operates at least partially according to the schedule generated by the scheduler. Instead, the site-wide simulating section 140 may output the site-wide simulation results obtained in a case where the production site 120 operates according to a schedule that is different from the schedule generated by the scheduler. The site-wide simulating section 140 supplies the output site-wide simulation results to another function section or apparatus via a network, various memory devices, user input, or the like.

The process simulating section 150 simulates the operation of each on-site process unit (group). That is, the process simulating section 150 simulates the behavior of reactions corresponding to input, output, and processing content of each on-site process unit (group). As an example, the process simulating section 150 acquires site information that is more detailed and tailored to each on-site process unit (group) compared to the linear programming in the site planning section 130, via a network, various memory devices, user input, or the like. Then, for example, the process simulating section 150 inputs the more detailed site information into the steady state model, simulates the operation of each on-site process unit (group), and outputs more detailed simulation results for each on-site process unit (group). At this time, the process simulating section 150 may output the simulation results of each on-site process unit (group) based at least partially on the schedule information generated by the scheduler. In other words, the process simulating section 150 may output the simulation results of each on-site process unit (group) obtained in a case where each on-site process unit (group) operates at least partially according to the schedule generated by the scheduler. Instead, the process simulating section 150 may output the simulation results of each on-site process unit (group) obtained in a case where each on-site process unit (group) operates according to a schedule different from the schedule generated by the scheduler. The process simulating section 150 supplies the output simulation results of each on-site process unit (group) to another function section or apparatus via a network, various memory devices, user input, or the like.

The blending simulating section 155 simulates the operation of each process unit (group) that is related to blend property control and located off-site. That is, the blending simulating section 155 simulates the behavior of reactions corresponding to input, output, and processing content each off-site process unit (group) related to blend property control. Blend property control refers to control performed to mix together each component at an off-site location and create products that satisfy certain standards with minimum cost and maximum throughput. The blending simulating section 155 acquires site information that is more detailed and tailored to each off-site process unit (group) related to blend property control, compared to the site information used when the site-wide simulating section 140 output the site-wide simulation results, via a network, various memory devices, user input, or the like. Then, for example, the blending simulating section 155 inputs the more detailed site information into the steady state model, simulates the operation of each off-site process unit (group) related to blend property control, and outputs more detailed simulation results for each off-site process unit (group) related to blend property control. At this time, the blending simulating section 155 may output the simulation results of each off-site process unit (group) related to blend property control based at least partially on the schedule information generated by the scheduler. In other words, the blending simulating section 155 may output the simulation results of each off-site process unit (group) related to blend property control obtained in a case where each off-site process unit (group) related to blend property control operates at least partially according to the schedule generated by the scheduler. Instead, the blending simulating section 155 may output the simulation results of each off-site process unit (group) related to blend property control obtained in a case where each off-site process unit (group) related to blend property control operates according to a schedule different from the schedule generated by the scheduler. The blending simulating section 155 supplies the output simulation results of each off-site process unit (group) related to blend property control to another function section or apparatus via a network, various memory devices, user input, or the like.

The APC 160 is implemented for each process unit (group) that requires advanced control and is located on-site, and performs control at a higher level than the on-site process control system 170 that controls these process units (groups), for example. As an example, the APC 160 may set a target value that is a target for controlling the process units (groups), based on at least one of the schedule information generated by the scheduler, a logical unit grouping process simulation of 2-3 units, or the simulation results for each on-site process unit (group) output by the process simulating section 150. The APC 160 then controls the process variation in these process units (groups) by using feedback control or feedforward control in accordance with the target value to perform advanced control of the on-site process control system 170. The APC 160 does not need to be provided for processes that do not justify advanced control.

The BPC 165 is implemented for each process unit (group) that is related to blend property control and located off-site, and performs blend property control for each of these process units (groups) at a higher level than the off-site process control system 175 that controls these process units (groups), for example. As an example, the BPC 165 may perform higher level control of the off-site process control system 175 controlling the process units (groups) related to blend property control, based on at least one of the schedule information generated by the scheduler, the site-wide simulation results output by the site-wide simulating section 140, or the simulation results for each process unit (group) related to blend property control output by the blending simulating section 155.

The on-site process control system 170 is implemented for each on-site process unit (group), and is a process control system that automatically manages the operations and processes of these process units (groups), using a computer, for example. The process control system referred to here includes a DCS (Distributed Control System), SCADA (Supervisory Control and Data Acquisition), a digital control system, a production information control system, process IT, a technical IT system, or the like. As an example, the on-site process control system 170 may control the on-site process units (groups) based on at least one of the schedule information generated by the scheduler, the site-wide simulation results output by the site-wide simulating section 140, the simulation results of each on-site process unit (group) output by the process simulating section 150, or the control information from the APC 160.

The off-site process control system 175 may be a system similar to the on-site process control system 170, for example. The off-site process control system 175 is implemented for each off-site process unit (group), and is a process control system that automatically manages the operations and processes of these process units (groups), using a computer. As an example, the off-site process control system 175 may control the off-site process units (groups) based on at least one of the schedule information generated by the scheduler, the site-wide simulation results output by the site-wide simulating section 140, the simulation results of each process unit (group) relating to blend property control output by the blending simulating section 155, or the control information from the BPC 165.

The petrochemical sites 120C produce a plurality of chemical products such as synthetic fiber, synthetic resin, and synthetic rubber, by causing a chemical reaction with raw material. The petrochemical sites 120C are similar to the refineries 120R, aside from not including the blending simulating sections 155 and the BPCs 165, and therefore further description is omitted.

In the total solution model 100, there is only one system and only one set of a work process and a model, and all of these are integrated by the flow and transfer of data or information. Accordingly, such a total solution model 100 ensures that the data is accurately and efficiently processed among different groups in an organization. Therefore, as an example, it is possible to realize a large-scale system in which information is linked between a main branch of a company and a refinery, and between multiple refineries, and in which work processes are streamlined and manual work is eliminated.

Figure 2:
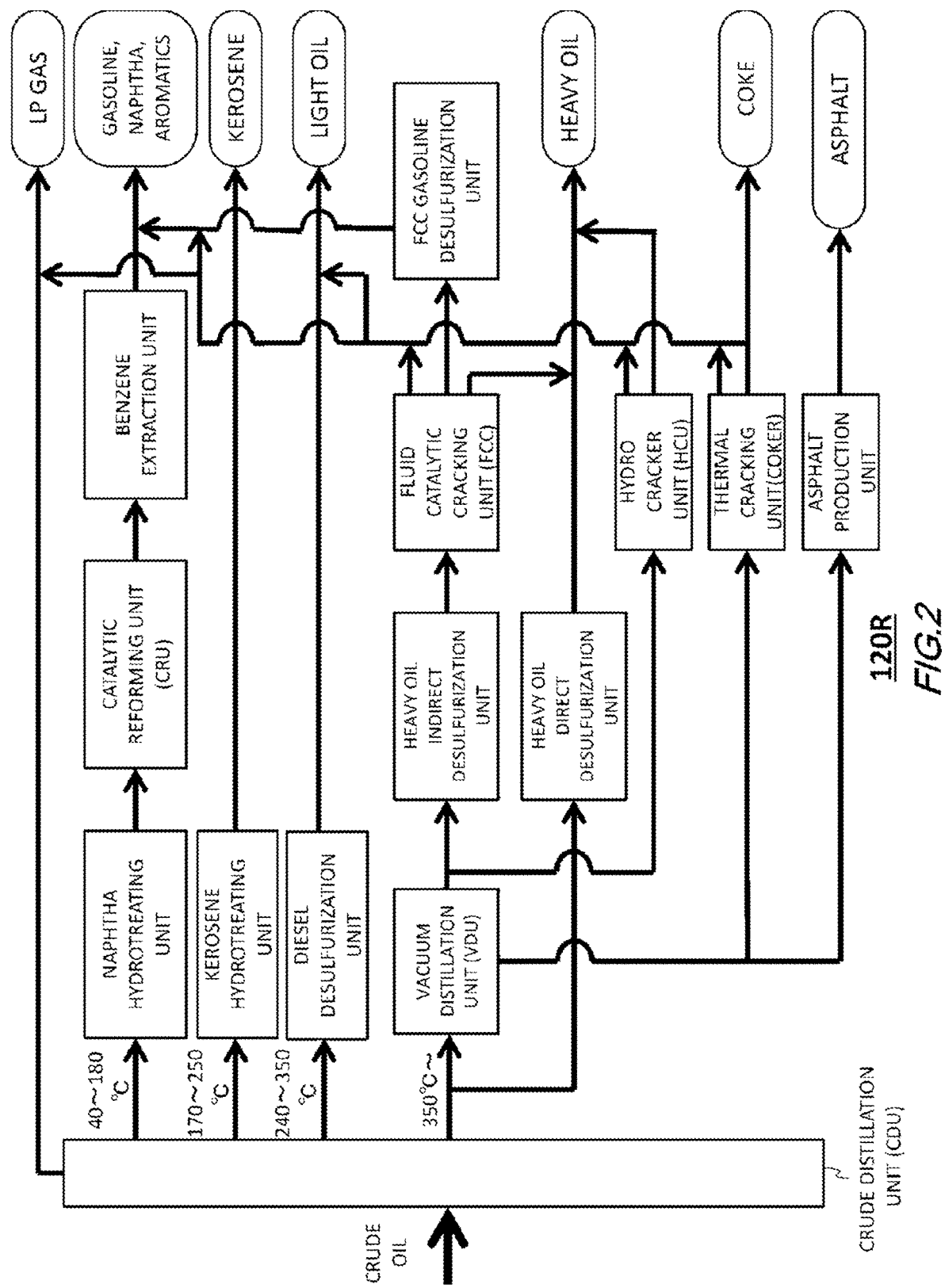
FIG. 2 shows an example of an oil refinement flow at a refinery 120R.

FIG. 2 shows an example of an oil refinement flow at a refinery 120R. At the refinery 120R, crude oil, which is a mixture of hydrocarbons with a wide boiling range, is refined to produce a plurality of petroleum products. Generally, at a refinery 120R, crude oil is distilled in a CDU (Crude Distillation Unit), and separated into fractions with different boiling ranges, i.e. a gas fraction, naphtha fraction, kerosene fraction, light diesel oil fraction, heavy diesel oil fraction and residue fraction, according to a cutoff temperature. LP gas is produced from the gas fraction. The naphtha fraction is hydro-desulfurized by a naphtha hydrotreating unit and then catalytically reformed by a catalytic reforming unit (CRU), and benzene is separated therefrom by a benzene extraction unit to produce gasoline, naphtha, aromatics, and the like. The kerosene fraction is hydro-desulfurized in a kerosene hydrotreating unit to produce kerosene. The light diesel oil fraction is desulfurized in a diesel desulfurization unit to produce light oil. The heavy diesel oil fraction is hydro-desulfurized by a heavy oil direct desulfurization unit to produce heavy oil. Also, the heavy diesel oil fraction is separated into light and heavy fractions in a vacuum distillation unit (VDU). The light fraction separated by VDU is hydro-desulfurized in a heavy oil indirect desulfurization unit, then catalytically cracked in a fluid catalytic cracking (FCC) unit and hydro-desulfurized by an FCC gasoline desulfurization unit, to produce gasoline. Alternatively the light fraction separated by VDU is processed in a hydrocracker unit (HCU). On the other hand, the heavy fraction separated by VDU is pyrolyzed in a thermal cracking unit (Coker) to produce coke, and is also processed in an asphalt production unit to produce asphalt. In the petrochemical industry, naphtha is the main feedstock and olefins e.g. ethylene, propylene and aromatics, e.g. benzene, toluene, aromatic hydrocarbons of xylene (overall so-called BTX) are the main materials obtained.

In the total solution model 100, the on-site process units may include the units described above in the refinery 120R, for example, and the on-site process control system 170 may control the operations and processes of these units. Furthermore, the APC 160 may be implemented for each unit that is particularly important for the operation of the refinery 120R, such as the CDU, VDU, FCC, and CRU, among the units described above, for example.

Figure 3:
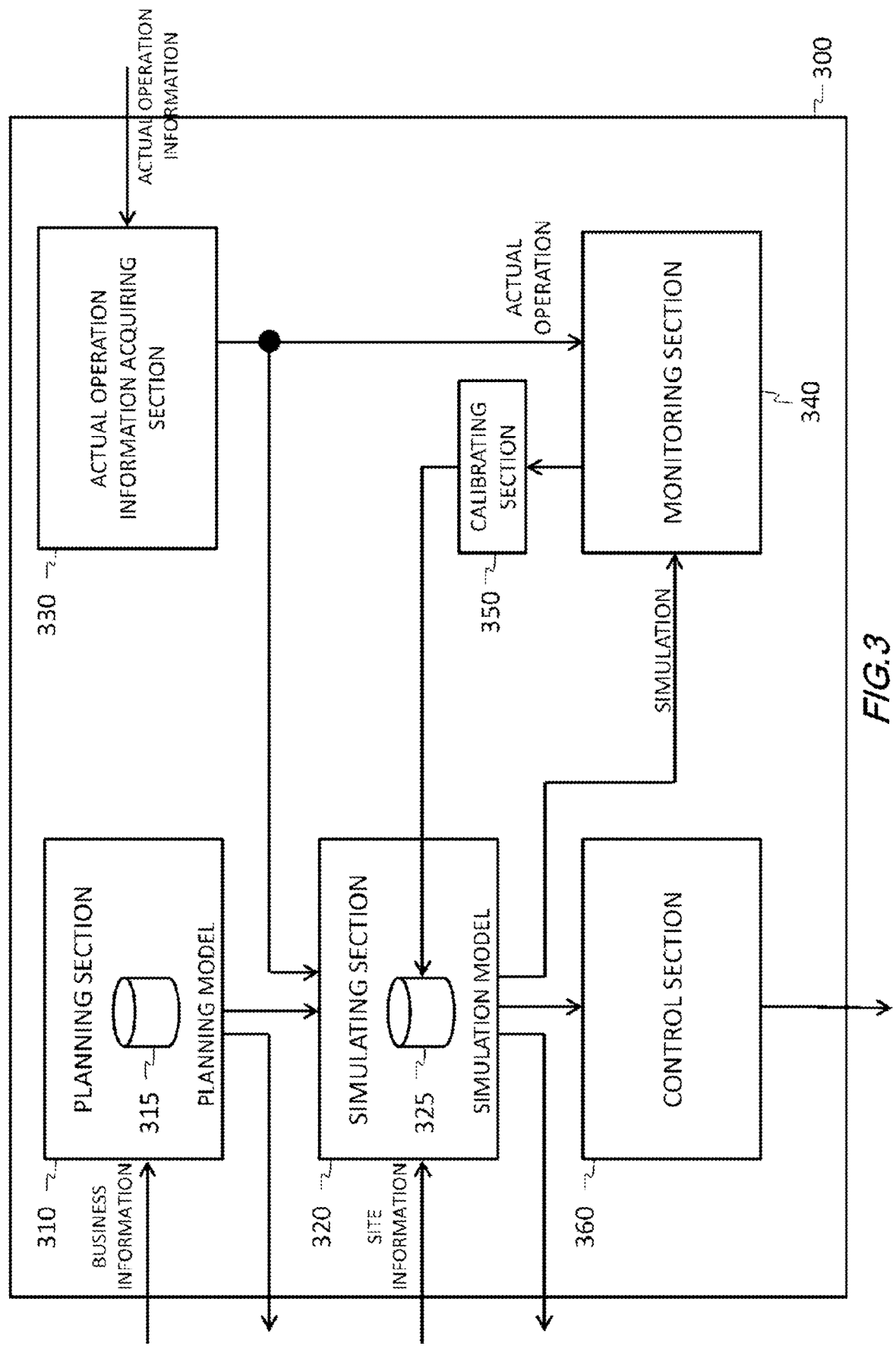
FIG. 3 shows an example of a block diagram of a system 300 according to the present embodiment.

FIG. 3 shows an example of a block diagram of a system 300 according to the present embodiment. The system 300 may realize a portion of the functions of the total solution model 100 shown in FIG. 1, for example. The system 300 according to the present embodiment calibrates the model for simulating the operation of the production site 120 based on the difference between the simulation results and the actual operating situation, and controls the production site 120 based on the simulation results obtained using the calibrated model.

The system 300 may be a computer such as a PC (personal computer), tablet computer, smartphone, work station, server computer, or general user computer, or may be a computer system in which a plurality of computers are connected. Such a computer system is also a computer, in a broad sense. The system 300 may be implemented in a virtual computer environment that can be executed in one or more computers. Instead, the system 300 may be a specialized computer designed for the purpose of operation of the production site, or may be specialized hardware realized by specialized circuitry. If the system 300 is capable of connecting to the Internet, the system 300 may be realized by cloud computing.

The system 300 according to the present embodiment includes a planning section 310, a simulating section 320, an actual operation information acquiring section 330, a monitoring section 340, a calibrating section 350, and a control section 360. Each block in the present drawing indicates a function block, and does not necessarily correspond to an actual device configuration or apparatus configuration. In other words, in the present drawing, just because function blocks are drawn as separate blocks, this does not limit the configuration to using separate devices or apparatuses for these functions. Furthermore, in the present drawing, just because a function block is shown by a single block, this does not limit the configuration to using a single device or apparatus for this function.

The planning section 310 includes a planning model 315, and generates the production plan for the production site 120 using the planning model 315. Here, the planning model 315 may be a linear programming model, for example. In other words, the planning model 315 derives a combination of variable values that maximize (or minimize) the objective function of Math. 2, under the restraint conditions shown by Math. 1, by repeatedly testing different combinations of a plurality of variables using matrix mathematics. For example, the planning section 310 may be at least one of the multi-site planning section 110 or the site planning section 130 in the total solution model 100. The planning section 310 acquires the business information via a network, various memory devices, user input, or the like, and generates the production plan using the acquired business information. Furthermore, the planning section 310 supplies the schedule information corresponding to the generated production plan to the simulating section 320. The planning section 310 may supply the generated production plan and the schedule information to another function section or apparatus, via a network, various memory devices, user input, or the like.

The simulating section 320 includes a simulation model 325 of at least a portion of the production site 120, and simulates the operation of at least a portion of the production site 120 based on this simulation model 325. As an example, the simulating section 320 may be at least one of the site-wide simulating section 140, the process simulating section 150, or the blending simulating section 155 in the total solution model 100. The simulating section 320 acquires the site information relating to the production site 120, via a network, various memory devices, user input, or the like. Furthermore, the simulating section 320 acquires the schedule information generated by the planning section 310. The simulating section 320 then uses the acquired site information to simulate the operation of at least a portion of the production site 120 occurring in a case where the operation is performed according to the schedule information, for example, and outputs the simulation results for at least a portion of the production site 120. The simulating section 320 then supplies the output simulation results to the monitoring section 340 and the control section 360. The simulating section 320 may supply the output simulation results to another function section or apparatus, via a network, various memory devices, user input, or the like.

The actual operation information acquiring section 330 acquires the actual operation information, i.e. the performance, obtained when the production site 120 actually operates, via a network, various memory devices, user input, or the like. The actual operation information acquiring section 330 supplies the simulating section 320 and the monitoring section 340 with the acquired actual operation information.

The monitoring section 340 monitors the actual operation of at least a portion of the production site 120, using the actual operation information supplied from the actual operation information acquiring section 330. Then, when it is judged that calibration of the simulation model 325 is needed, the monitoring section 340 instructs the calibrating section 350 to calibrate the simulation model 325.

The calibrating section 350 calibrates the simulation model 325, based on the difference between the operation simulated by the simulating section 320 and the actual operation monitored by the monitoring section 340.

The control section 360 uses the calibrated simulation model 325 to control at least a portion of the production site 120, based on the simulation results obtained by simulating at least a portion of the operation at the production site 120 in accordance with the production plan.

The following is a detailed description, using a flow, of a case where the simulation model 325 is calibrated and the production site 120 is controlled by these function sections.

Figure 4:
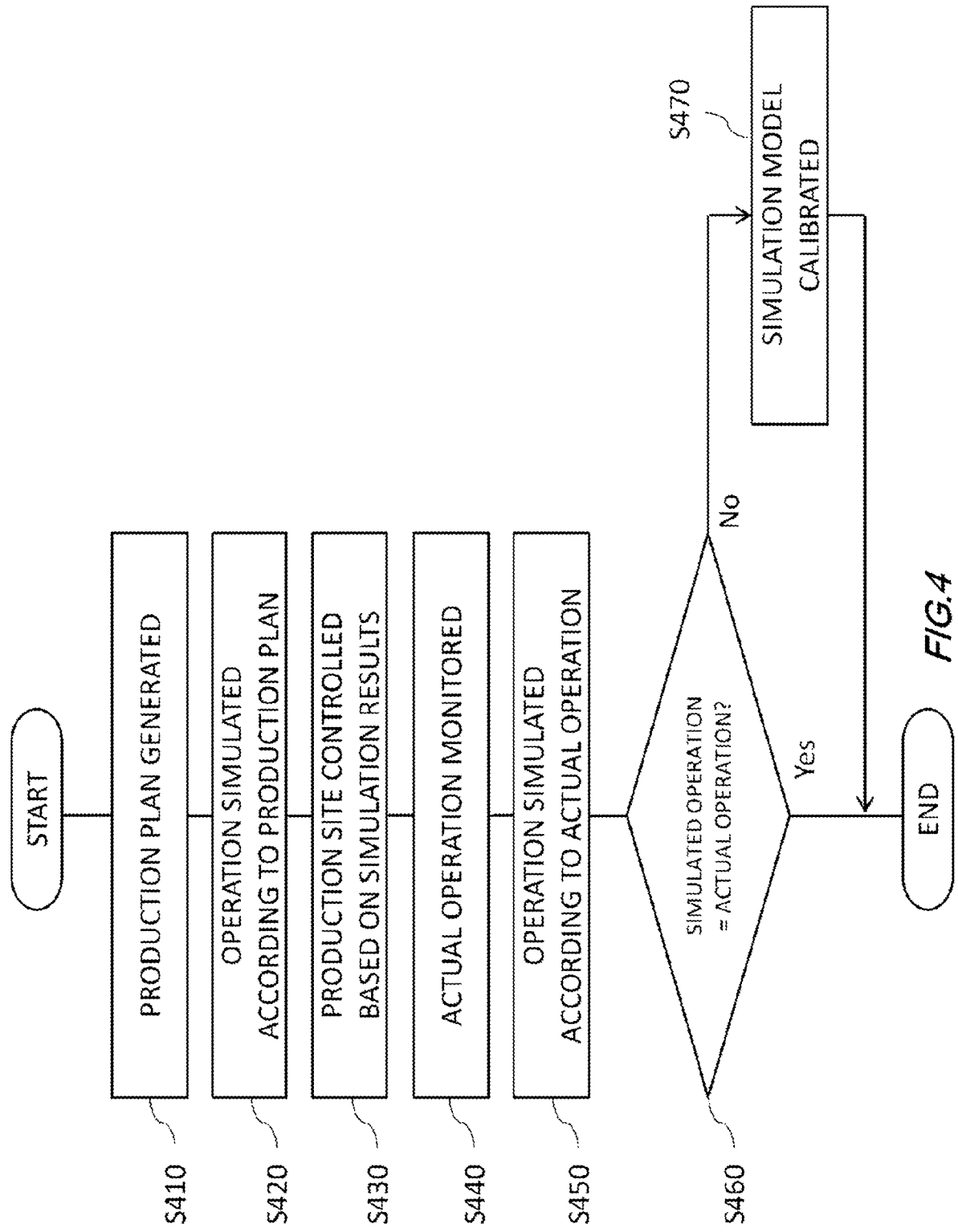
FIG. 4 shows an example of a flow by which the system 300 according to the present embodiment calibrates the simulation model 325 and controls the production site 120.

FIG. 4 shows an example of a flow by which the system 300 according to the present embodiment calibrates the simulation model 325 and controls the production site 120.

At step 410, the planning section 310 generates the production plan for the production site 120, using the planning model 315. Here, the planning model 315 may be a linear programming model, for example. In other words, the planning model 315 derives a combination of variable values that maximize (or minimize) the objective function of Math. 2, under the restraint conditions shown by Math. 1, by repeatedly testing different combinations of a plurality of variables using matrix mathematics.

The planning section 310 acquires business information including information such as crude oil quantity, crude oil type, crude oil price, product price, product demand, process unit availability, process unit maximum capacity, or the like via a network, various memory devices, user input, or the like, and inputs this business information to the planning model 315. Next, the planning model 315 derives a combination of variable values that maximize the "gross profit", using the linear programming technique described above. In this case, the planning section 310 then generates the production plan including information such as oil balance, economic balance, gross profit, operating cost or net profit, energy balance, a process unit summary, a marginal value, a blend summary, and reports concerning any of the above. The planning section 310 then supplies the simulating section 320 with the schedule information corresponding to the generated production plan.

At step 420, the simulating section 320 simulates the operation of at least a portion of the production site 120 in accordance with the production plan, based on the simulation model 325 of at least a portion of the production site 120. Here, the simulation model 325 may be a steady state model.

In the manner described above, the production site 120 may include a refinery 120R that produces a plurality of petroleum products by refining crude oil, for example. Accordingly, at least a portion of the production site 120 may include at least one of a crude distillation unit, vacuum distillation unit, naphtha hydrotreating unit, catalytic reforming unit, benzene extraction unit, kerosene hydrotreating unit, diesel desulfurization unit, heavy oil desulfurization unit (e.g. heavy oil indirect desulfurization and/or heavy oil direct desulfurization unit), fluid catalytic cracking unit, FCC gasoline desulfurization unit, thermal cracking unit, hydrocracker unit, or asphalt production unit in the refinery 120R. The simulating section 320 simulates the operation of one of an on-site process unit, which may include these units described above, for example. At this time, the simulating section 320 may simulate the operation of one process unit at the production site 120, or may simulate the operation of a group of a plurality of process units at the production site 120.

As an example, the simulating section 320 acquires the site information including information such as supply flow, product flow, temperature, pressure, and lab data concerning supply quality and product quality at the production site 120 obtained from mini tests or the like performed for a period of several hours, and at intervals of once or twice a month when full lab data is available, on the process units at the production site 120, via a network, various memory devices, user input, or the like, and inputs this site information to the simulation model 325 that is a steady state model. Next, as an example, the simulation model 325 simulates the behavior of reactions corresponding to the input, output, and processing content in at least a portion of the production site 120 in a case where the at least a portion of the production site 120 operates according to the schedule information in accordance with the production plan.

At this time, the simulating section 320 simulates operation of the production site 120 in each of a plurality of cases where different values are used as the control parameters for controlling at least a portion of the production site 120. For example, when the simulating section 320 simulates the operation of one process unit at the production site 120, the simulating section 320 simulates the operation of the one process unit for each of a plurality of cases where different values are used as the control parameters for controlling the one process unit. Furthermore, when the simulating section 320 simulates the operation of a group of a plurality of process units at the production site 120, the simulating section 320 simulates the operation of the plurality of process units for each of a plurality of cases where a set of different values is used as the control parameters for controlling the plurality of process units.

For each of these cases, the simulating section 320 outputs simulation results including information such as the targets for production amount, stream properties and optimal operating conditions for at least a portion of the production site 120. The targets are more accurate and detailed than the production plan generated by the planning section 310, and can be used to supervise the APC 160. The simulating section 320 supplies the monitoring section 340 and the control section 360 with these simulation results obtained by simulating operation of at least a portion of the production site 120.

At step 430, the control section 360 controls the production site 120 based on the simulation results supplied at step 420. For example, in a case where at least a portion of the production site 120 is one process unit at the production site 120, the control section 360 selects a control parameter that realizes the best simulation result among a plurality of simulation results obtained by simulating the operation of at least a portion of the production site 120 a plurality of times using different control parameters. Furthermore, in a case where at least a portion of the production site 120 is a group of a plurality of process units at the production site 120, the control section 360 selects a set of control parameters that realizes the best simulation result among a plurality of simulation results obtained by simulating the operation of at least a portion of the production site 120 a plurality of times using different sets of control parameters. In other words, when determining a control parameter (or set of control parameters) for controlling at least a portion of the production site 120, the control section 360 selects a control parameter (or set of control parameters) that realizes the best simulation result, such as realizing the maximum "gross profit", for example, from among a plurality of simulation results obtained by simulating the operation of at least a portion of the production site 120 a plurality of times while changing values of the control parameter (or set of control parameters).

The above description is an example in which the control section 360 selects a control parameter (or set of control parameters) that maximizes the "gross profit", but the present embodiment is not limited to this. For example, the control section 360 may select a control parameter (or set of control parameters) that realizes the best simulation result in a case of a simulation for maximizing conversion efficiency, maximizing a gasoline octane volume, maximizing the production amount of a high-price product, minimizing the production amount of a low-cost product, or the like. The control section 360 actually controls at least a portion of the production site 120 using the control parameter (or set of control parameters) that has been determined.

The control referred to here is not limited to direct control of at least a portion of the production site 120 by the control section 360, and includes setting of a target value that is a target for controlling at least a portion of the production site 120 with the control section 360, for example. In other words, based on the simulation results, the control section 360 directly controls a process unit (group) or sets a target value that is a target for controlling the process unit (group) with the APC 160, the BPC 165, the on-site process control system 170, the off-site process control system 175, or the like that control the process unit (group).

As described above, at least a portion of the production site 120 may include at least one of a crude distillation unit, vacuum distillation unit, naphtha hydrotreating unit, catalytic reforming unit, benzene extraction unit, kerosene hydrotreating unit, diesel desulfurization unit, heavy oil desulfurization unit, fluid catalytic cracking unit, FCC gasoline desulfurization unit, thermal cracking unit, hydrocracker unit, or asphalt production unit in the refinery 120R.

As an example, in the catalytic reforming unit, low-octane straight-run naphtha is converted into high-octane reformate by a cyclization and dehydrogenation reaction. Furthermore, in the fluid catalytic cracking unit, a reaction to decompose the large molecular heavy oil fraction into an intermediate distillate or gasoline with low molecular weight is encouraged by causing the heavy oil to contact the fluid catalytic cracking catalyst at a high temperature of 500° C. or more. In the hydrotreating unit, purification of petroleum fractions containing impurities such as sulfur is performed using hydro-desulfurization in which hydrogen is made to react in the presence of a catalyst. In this way, various reactions are performed in various reactors at the oil refinery. The temperatures of such reactors can have a significant effect on the quality and production amount of petroleum products. Accordingly, the control section 360 may set the temperatures of such reactors as control targets.

As another example, in the crude distillation unit, crude oil is separated into fractions with different boiling point ranges according to cut temperatures, namely a gas fraction, a naphtha fraction, a kerosene fraction, a light diesel oil fraction, a heavy diesel oil fraction and a residue fraction. Such a cut temperature can have a significant effect on the quality and production amount of petroleum products. Accordingly, the control section 360 may set such cut temperatures as control targets.

The control section 360 may set other control parameters as control targets, such as furnace outlet temperatures indicating outlet temperatures of various furnaces, stripping steam ratio indicating the rate of steam introduced into the bottom of a distillation or stripper tower, reflux ratio indicating the ratio of refluxing a portion of a distillate into a tower, reboiler duty and heat removal rate of a pump around. In other words, the control section 360 may typically control at least one of the reactor temperature, distillation cut temperature, furnace outlet temperature, stripping steam ratio, reflux ratio, reboiler duty or pump around heat removal rate. These control parameters are important parameters that have a significant effect on the quality and production amount of petroleum products in oil refinement. However, these control parameters have conventionally been set based on the instincts and experience of workers such as engineers and operators. In contrast to this, according to the system 300 of the present embodiment, these control parameters are controlled based on the simulation results obtained using the simulation model 325 that is maintained to be highly accurate. Therefore, the system 300 according to the present embodiment can objectively control these control parameters, reduce the burden placed on workers, and eliminate the need for instincts and experience of workers when determining important parameters.

At step 440, the actual operation information acquiring section 330 acquires, as actual operation information, the actual results obtained when at least a portion of the production site 120 actually operated using the control parameter (or set of control parameters) selected at step 430. The actual operation information acquiring section 330 supplies the acquired actual operation information to the simulating section 320 and the monitoring section 340. The monitoring section 340 then monitors the actual operation of at least a portion of the production site 120, using the actual operation information supplied from the actual operation information acquiring section 330.

At step 450, the simulating section 320 simulates the operation of at least a portion of the production site 120 in a case where at least a portion of the production site 120 has operated according to the actual operation, using the simulation model 325. Here, it is possible for there to be cases where the production plan generated by the planning section 310 at step 410 differs from the actual operation. For example, unexpected changes to the plan can occur after the timing when the planning section 310 has generated the production plan, such as a case where a ship carrying crude oil cannot meet its schedule, a case where a process unit at the production site 120 has performed an emergency shutdown, or the like. Therefore, if the changes are significant, the simulating section 320 may again simulate the operation of the production site 120 according to the production plan that has been rerun to reflect the changes. In this way, the simulating section 320 can generate simulation results that reflect the plan according to which the operation was actually performed, while taking into consideration the plan that could not be known at the timing when the production plan was generated. The simulating section 320 supplies the monitoring section 340 with the simulation results obtained by simulating the operation of the production site 120 according to the actual operation plan.

At step 460, the monitoring section 340 makes a comparison between the simulation results supplied from the simulating section 320 at step 450 and the actual operation information supplied from the actual operation information acquiring section 330 at step 440, and if the difference there between is less than or equal to a predetermined threshold value, judges that the simulated operation matches the actual operation and ends the process. On the other hand, if the comparison of step 460 indicates that this difference is greater than the predetermined threshold value, the monitoring section 340 judges that the simulated operation does not match the actual operation, judges that the simulation model 325 needs calibration, and instructs the calibrating section 350 to calibrate the simulation model 325.

When judging whether the simulated operation and the actual operation match, the monitoring section 340 may compare the simulation results and actual operation information to each other while focusing on any characteristic. For example, the monitoring section 340 may make the comparison while focusing on a prescribed characteristic such as the production amount or property, while focusing on another characteristic, or while focusing on a plurality of characteristics.

At step 470, the calibrating section 350 calibrates the simulation model 325 based on the difference between the simulated operation and the actual operation, and ends the process. For example, the calibrating section 350 updates an adjustable parameter in the model in a manner to minimize the difference between the simulated operation and the actual operation. In this way, when the difference between the simulated operation and the actual operation exceeds the predetermined threshold value, the calibrating section 350 may calibrate the simulation model 325. In this case, by making it possible for the user to set this threshold value, the trigger for the calibration of the simulation model 325 can be controlled.

By repeatedly performing the flow of FIG. 4, the system 300 calibrates the simulation model 325 based on the actual operating conditions, and controls the production site 120 based on the simulation results obtained using the calibrated simulation model 325.

Conventionally, when performing worldwide operation of a large-scale production site 120, the enterprise resource planning, manufacturing execution, and process control have each been performed independently by different groups (or departments) in the organization and each using their own tools and systems that have no or limited integration with those in other groups (or departments). Accordingly, the control of the production site 120 in accordance with the production plan is performed independently by a process control department, and the simulation model 325 is calibrated independently by the manufacturing execution department. Therefore, when the simulation model 325 has been calibrated, the simulation results obtained by using the calibrated simulation model 325 are not reflected in the actual control of the production site 120. In contrast to this, according to the system 300 of the present embodiment, the simulation model 325 is calibrated based on the actual operating situation and the production site 120 is controlled based on the simulation results obtained using the calibrated simulation model 325. Therefore, it is possible to accurately maintain the simulation model 325 for simulating the operation of the production site 120, and to reflect the simulation results obtained using this simulation model 325 in the actual control of the production site 120. Accordingly, the system 300 can enable continued accurate modeling of the production site 120, and maximize the objective function by optimizing the operations of a plurality of process units based on the simulation results obtained using the simulation model 325 that is accurately modeled. In this way, according to the system 300 of the present embodiment, it possible to reliably and quickly work through the PDCA (Plan-Do-Check-Act) cycle of operation management at the production site 120, and to more efficiently perform operation of the production site 120 by deriving the maximum amount of cooperation among a plurality of departments.

Furthermore, generally when controlling a group of a plurality of process units, controlling one of these process units results in an effect on the control of the other process units. Accordingly, even if the control is optimized for each process unit, there are cases where the optimal control is not realized when considering the entire group of the plurality of process units. In contrast to this, according to the system 300 of the present embodiment, when controlling a group of a plurality of process units, the set of control parameters that realize the best simulation results are selected from among the plurality of simulation results obtained by performing the simulation a plurality of times using different sets of control parameters. Therefore, the system 300 according to the present embodiment can optimize the control of the entire group of the plurality of process units.

Figure 5:
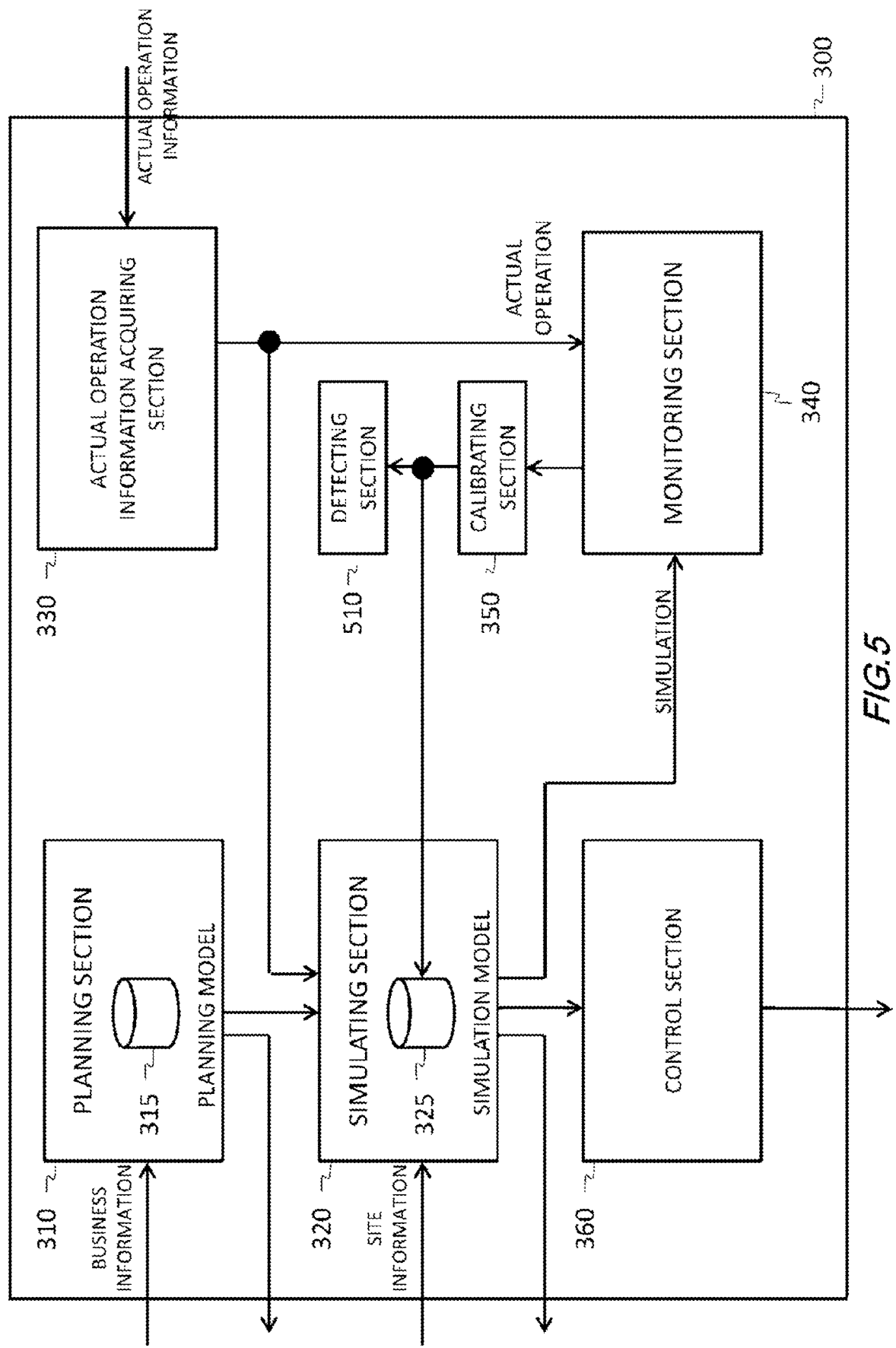
FIG. 5 shows an example of a block diagram of the system 300 according to a modification of the present embodiment.

FIG. 5 shows an example of a block diagram of the system 300 according to a modification of the present embodiment.

In FIG. 5, components that have the same function and configuration as in FIG. 3 are given the same reference numerals, and the descriptions include only differing points. The system 300 according to the present modification further includes a detecting section 510.

The detecting section 510 detects deterioration or improvement of at least a portion of the production site 120, based on a parameter that has been calibrated in the simulation model 325. For example, if a calibrated parameter is a specified parameter relating to deterioration or improvement of a process unit, the detecting section 510 may judge that the process unit related to this specified parameter has deteriorated or improved. Furthermore, for a parameter that has been calibrated, if the change in a numerical value before and after calibration is greater than a predetermined threshold value, the detecting section 510 may judge that the process unit related to this parameter has deteriorated or improved. In other words, if there is a very large change in a parameter due to the calibration of the simulation model 325, the detecting section 510 may judge that the process unit relating to this parameter has deteriorated or improved. Furthermore, for a parameter that has been calibrated, if the interval between calibrations is less than a predetermined threshold value, the detecting section 510 may judge that the process unit relating to this parameter has deteriorated or improved. In other words, the detecting section 510 may judge that a process unit relating to a parameter that is calibrated very frequently has deteriorated or improved.

In this way, the system 300 according to the present modification can, in addition to calibrating the simulation model 325 and updating the planning model 315, detect deterioration or improvement of at least a portion of the production site 120 based on a parameter used for calibration of the simulation model 325, and notify the user of this deterioration or improvement.

Various embodiments of the present invention may be described with reference to flowcharts and block diagrams whose blocks may represent (1) steps of processes in which manipulations are performed or (2) sections of apparatuses responsible for performing manipulations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical manipulations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing manipulations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing manipulations specified in the flowcharts or block diagrams. Examples of processors include computer processors, processing units, microprocessors, digital signal processors, controllers, microcontrollers, etc.

Figure 6:
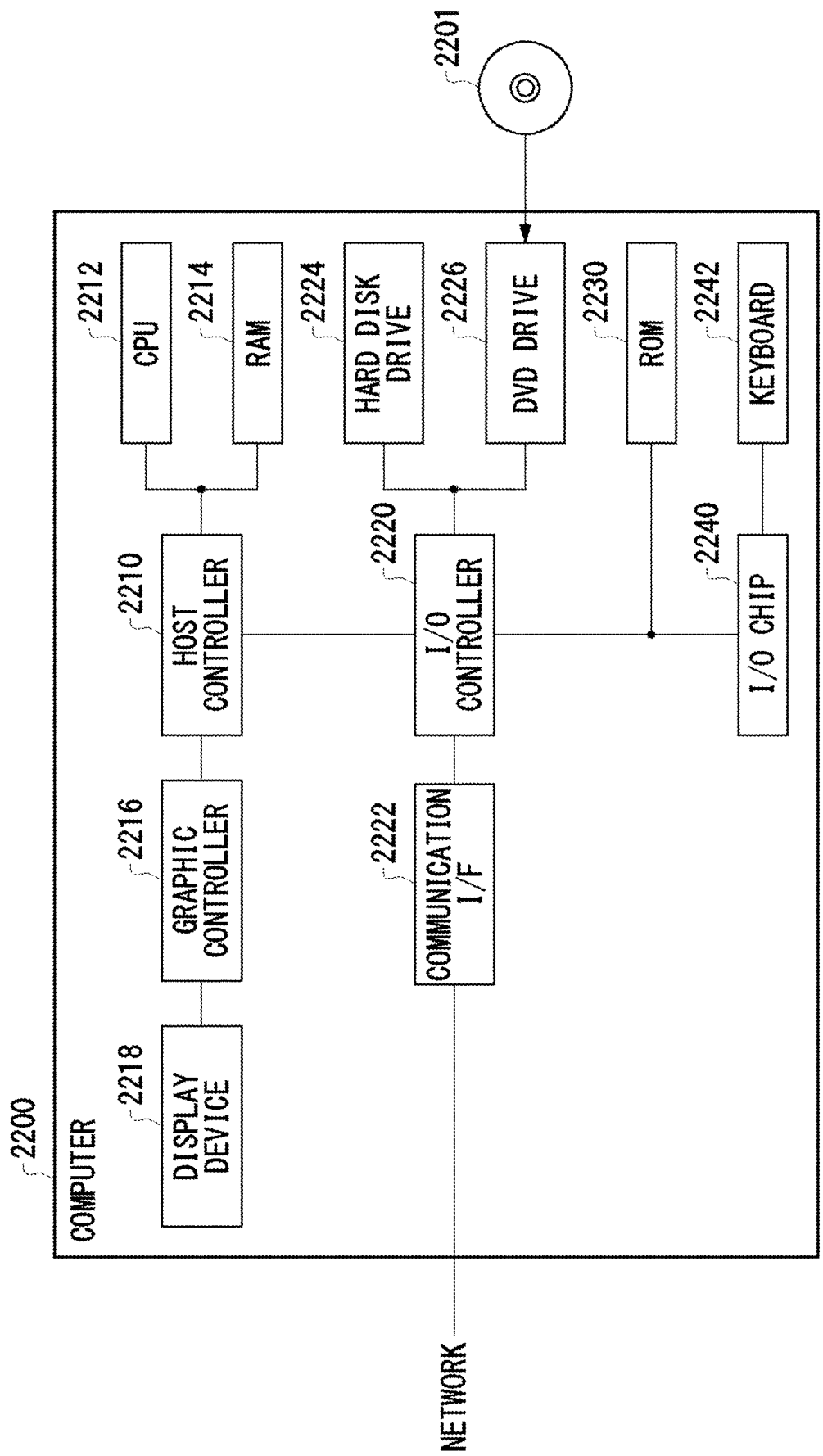
FIG. 6 shows an example of a computer 2200 in which aspects of the present invention may be wholly or partly embodied.

FIG. 6 shows an example of a computer 2200 in which aspects of the present invention may be wholly or partly embodied. A program that is installed in the computer 2200 can cause the computer 2200 to function as or perform manipulations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain manipulations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, or the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the manipulation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc. and perform various types of processes on data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of manipulations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

100: total solution model
110: multi-site planning section
120: production site
120R: refinery
120C: petrochemical site
130: site planning section
140: site-wide simulating section
150: process simulating section
155: blending simulating section
160: APC
165: BPC
170: on-site process control system
175: off-site process control system
300: system
310: planning section
315: planning model
320: simulating section
325: simulation model
330: actual operation information acquiring section
340: monitoring section
350: calibrating section
360: control section
510: detecting section
2200: computer
2201: DVD-ROM
2210: host controller
2212: CPU
2214: RAM
2216: graphic controller
2218: display device
2220: input/output controller
2222: communication interface
2224: hard disk drive
2226: DVD-ROM drive
2230: ROM
2240: input/output chip
2242: keyboard

What is claimed is:

1. A control system for controlling a production site configured to produce one or more production site outputs selected from one or more of products, semi-finished products, and intermediates, the control system comprising:
   at least a portion of the production site that includes at least one process unit; and one or more computers executing one or more programs that cause the one or more computers to provide functioning sections comprising:
a planning section that generates a production plan for the production site and schedule information corresponding to the production plan, using a planning model;
an actual operation information acquiring section acquires actual operation information, obtained when the production site actually operates, via a network;
a simulating section that simulates operation of the at least a portion of the production site based on a simulation model of the at least a portion of the production site, the simulating section acquires site information relating to the production site and the schedule information corresponding to the production plan supplied by the planning section, the simulating section uses the site information to simulate the operation of the at least a portion of the production site occurring in a case where the operation of the at least a portion of the production site is performed according to the schedule information and generate a simulation result, and the simulating section outputs the simulation result for the at least a portion of the production site;
a monitoring section that monitors actual operation of the at least a portion of the production site using the actual operation information supplied by the actual operation information acquiring section;
a calibrating section that calibrates the simulation model, based on a difference between the simulated operation and the actual operation, to generate a simulation model that has been calibrated; and
a control section that controls the at least a portion of the production site based on the simulation result obtained from the simulating section,
wherein the simulation result outputted by the simulating section includes information such as targets for a production amount, stream properties, and optimal operating conditions for the at least a portion of the production site, wherein the one or more computers executing the one or more programs are configured to provide for the simulating section to supply the simulation result, which includes the targets for the production amount, the stream properties, and the optimal operating conditions for the at least a portion of the production site, to the monitoring section and the control section,
wherein the monitoring section is configured to compare the simulation result supplied from the simulating section and the actual operation information supplied from the actual operation information acquiring section, and if a difference between the simulation result and the actual operation information exceeds a predetermined threshold value, the monitoring section signals the calibrating section to calibrate the simulation model,
wherein the simulation model used by the simulating section to generate the simulation result is the simulation model that has been calibrated in a case where the calibrating section has generated the simulation model that has been calibrated, and
wherein the control section controls the at least a portion of the production site by using the simulation result to set one or more targets for the production amount, the stream properties and the optimal operating conditions for the at least a portion of the production site, which are used by the control section to automatically control the at least one process unit using one of feedback control and feedforward control.

2. The system according to claim 1, wherein the production site includes a refinery that produces a plurality of petroleum products by refining crude oil.

3. The system according to claim 2, wherein the at least a portion of the production site includes at least one of a crude distillation unit, vacuum distillation unit, naphtha hydrotreating unit, catalytic reforming unit, benzene extraction unit, kerosene hydrotreating unit, diesel desulfurization unit, heavy oil desulfurization unit, fluid catalytic cracking unit, FCC gasoline desulfurization unit, thermal cracking unit, hydrocracker unit, or asphalt production unit.

4. The system according to claim 3, wherein the control section controls at least one of a reactor temperature, distillation cut temperature, furnace outlet temperature, stripping steam ratio, reflux ratio, reboiler duty or pump around heat removal rate.

5. The system according to claim 1, wherein the at least a portion of the production site is one process unit at the production site.

6. The system according to claim 2, wherein the at least a portion of the production site is one process unit at the production site.

7. The system according to claim 3, wherein the at least a portion of the production site is one process unit at the production site.

8. The system according to claim 1, wherein the at least a portion of the production site is a group of a plurality of process units at the production site.

9. The system according to claim 2, wherein the at least a portion of the production site is a group of a plurality of process units at the production site.

10. The system according to claim 3, wherein the at least a portion of the production site is a group of a plurality of process units at the production site.

11. The system according to claim 8, wherein the control section selects a set of control parameters that realizes a simulation result that maximizes gross profit, from among a plurality of simulation results obtained by simulating operation of the at least a portion of the production site a plurality of times using different sets of control parameters.

12. The system according to claim 1, wherein the simulation model is a steady state model.

13. The system according to claim 2, wherein the simulation model is a steady state model.

14. The system according to claim 3, wherein the simulation model is a steady state model.

15. The system according to claim 1, wherein the planning model is a linear programming model.

16. The system according to claim 2, wherein the planning model is a linear programming model.

17. A method comprising:
generating a production plan for a production site and schedule information corresponding to the production plan, using a planning model, using one or more computers;
acquiring actual operation information, obtained when the production site actually operates, via a network;
simulating operation of at least a portion of the production site, based on a simulation model of the at least a portion of the production site, using the one or more computers, wherein simulating operation of at least a portion of the production site includes acquiring site information relating to the production site and the schedule information corresponding to the production plan, using the acquired site information to simulate the operation of the at least a portion of the production site occurring in a case where the operation of the at least a portion of the production site is performed according to the schedule information, generating a simulation result, and outputting the simulation result for the at least a portion of the production site;

monitoring actual operation of the at least a portion of the production site using the one or more computers and the actual operation information;

comparing the simulation result and the actual operation information, and if a difference between the simulation result and the actual operation information exceeds a predetermined threshold value, calibrating the simulation model, using the one or more computers, to generate a simulation model that has been calibrated; and automatically controlling the at least a portion of the production site, using the one or more computers, based on the simulation result, wherein the simulation result includes information such as targets for a production amount, stream properties, and optimal operating conditions for the at least a portion of the production site, and the one or more computers are operated by executing one or more programs to supply the simulation result, which includes the targets for the production amount, the stream properties, and the optimal operating conditions for the at least a portion of the production site, for the automatically controlling the at least a portion of the production site, wherein the simulation model used to generate the simulation result is the simulation model that has been calibrated in a case where the simulation model that has been calibrated has been generated, wherein the at least a portion of the production site includes at least one process unit, and wherein the automatically controlling the at least a portion of the production site comprises:

operating the one or more computers by executing the one or more programs to use the simulation result to set one or more targets for the production amount, the stream properties and the optimal operating conditions for the at least a portion of the production site;

using one of feedback control and feedforward control in accordance with one or more of the targets to automatically control the at least one process unit.

18. A non-transitory computer readable recording medium having recorded thereon a program that, when executed by one or more computers, causes the one or more computers to function as:

a planning section that generates a production plan for a production site and schedule information corresponding to the production plan, using a planning model;

an actual operation information acquiring section acquires actual operation information, obtained when the production site actually operates, via a network;

a simulating section that simulates operation of at least a portion of the production site based on a simulation model of the at least a portion of the production site, the simulating section acquires site information relating to the production site and the schedule information corresponding to the production plan supplied by the planning section, the simulating section uses the site information to simulate the operation of the at least a portion of the production site occurring in a case where the operation of the at least a portion of the production site is performed according to the schedule information and generate a simulation result, and the simulating section outputs the simulation result for the at least a portion of the production site;

a monitoring section that monitors actual operation of the at least a portion of the production site using the actual operation information supplied by the actual operation information acquiring section;

a calibrating section that calibrates the simulation model, based on a difference between the simulated operation and the actual operation, to generate a simulation model that has been calibrated; and a control section that controls the at least a portion of the production site based on the simulation result obtained from the simulating section, wherein the simulation result outputted by the simulating section includes information such as targets for a production amount, stream properties, and optimal operating conditions for the at least a portion of the production site, wherein the one or more computers executing the program are configured to provide for the simulating section to supply the simulation result, which includes the targets for the production amount, the stream properties, and the optimal operating conditions for the at least a portion of the production site, to the monitoring section and the control section, wherein the monitoring section is configured to compare the simulation result supplied from the simulating section and the actual operation information supplied from the actual operation information acquiring section, and if a difference between the simulation result and the actual operation information exceeds a predetermined threshold value, the monitoring section signals the calibrating section to calibrate the simulation model, wherein the simulation model used by the simulating section to generate the simulation result is the simulation model that has been calibrated in a case where the calibrating section has generated the simulation model that has been calibrated, and wherein the at least a portion of the production site includes at least one process unit and wherein the control section controls the at least a portion of the production site by using the simulation result to set one or more targets for the production amount, the stream properties and the optimal operating conditions for the at least a portion of the production site, which are used by the control section to automatically control the at least one process unit using one of feedback control and feedforward control.

19. The system according to claim 1, wherein the control system further comprises:

at least one on-site process control system, wherein the on-site process control system automatically manages the operation of the process unit, wherein the control section controls the at least one process unit by using one of the feedback control and the feedforward control in accordance with one or more of the targets to control the on-site process control system.

20. The system according to claim 1, wherein the control system is configured to repeatedly acquire the actual operation information, compare the actual operation information with the simulation result, generate a simulation model that has been calibrated when the difference between the actual operation information and the simulation result exceeds the predetermined threshold value, generate the simulation result using the simulation model that has been calibrated when the simulation model that has been calibrated has been generated, and supply the simulation result to the control section with the control section using the simulation result to set targets for the production amount, the stream properties and the optimal operating conditions for the at least a portion of the production site at least when the simulation model that has been calibrated has been generated.

* * * * *